US008533668B2

(12) United States Patent
de Oliveira Costa

(10) Patent No.: US 8,533,668 B2
(45) Date of Patent: Sep. 10, 2013

(54) COMPARING SOURCE CODE USING CODE STATEMENT STRUCTURES

(75) Inventor: Glauber de Oliveira Costa, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 387 days.

(21) Appl. No.: 12/767,601

(22) Filed: Apr. 26, 2010

(65) Prior Publication Data

US 2011/0265063 A1    Oct. 27, 2011

(51) Int. Cl.
*G06F 9/44*       (2006.01)
(52) U.S. Cl.
USPC .................. 717/110; 717/122; 717/170
(58) Field of Classification Search
None
See application file for complete search history.

(56) References Cited

U.S. PATENT DOCUMENTS

| | | | | |
|---|---|---|---|---|
| 7,117,488 | B1 * | 10/2006 | Franz et al. | 717/144 |
| 7,503,035 | B2 * | 3/2009 | Zeidman | 717/123 |
| 7,721,253 | B2 * | 5/2010 | Tatsumi et al. | 717/110 |
| 7,810,069 | B2 * | 10/2010 | Charisius et al. | 717/110 |
| 8,407,670 | B2 * | 3/2013 | Hegde et al. | 717/122 |
| 2002/0016954 | A1 * | 2/2002 | Charisius et al. | 717/2 |
| 2004/0049767 | A1 * | 3/2004 | Hooks | 717/122 |
| 2005/0039117 | A1 * | 2/2005 | Lwo | 715/513 |
| 2005/0114840 | A1 * | 5/2005 | Zeidman | 717/126 |
| 2005/0183074 | A1 * | 8/2005 | Alexander et al. | 717/144 |
| 2005/0262056 | A1 * | 11/2005 | Hamzy et al. | 707/3 |
| 2007/0234319 | A1 * | 10/2007 | Matsutsuka et al. | 717/140 |
| 2007/0283321 | A1 * | 12/2007 | Hegde et al. | 717/110 |
| 2008/0244522 | A1 * | 10/2008 | Bernin | 717/122 |
| 2008/0295085 | A1 * | 11/2008 | Rachamadugu et al. | 717/159 |
| 2008/0295089 | A1 * | 11/2008 | Huber | 717/170 |
| 2009/0089774 | A1 * | 4/2009 | Lynch et al. | 717/173 |
| 2009/0249291 | A1 * | 10/2009 | Bak et al. | 717/110 |
| 2009/0260000 | A1 * | 10/2009 | Pilant et al. | 717/170 |
| 2010/0083224 | A1 * | 4/2010 | Arnold | 717/110 |
| 2011/0125798 | A1 * | 5/2011 | Misch et al. | 717/110 |
| 2011/0209135 | A1 * | 8/2011 | Sakuma | 717/170 |
| 2011/0252400 | A1 * | 10/2011 | Scipione | 717/110 |
| 2012/0102454 | A1 * | 4/2012 | Burghard et al. | 717/110 |
| 2012/0167042 | A1 * | 6/2012 | Tillmann et al. | 717/110 |
| 2012/0284694 | A1 * | 11/2012 | Waugh et al. | 717/122 |
| 2012/0304148 | A1 * | 11/2012 | Braun et al. | 717/104 |
| 2013/0074035 | A1 * | 3/2013 | Nomura | 717/110 |

OTHER PUBLICATIONS

Chilowicz et al., "Towards a multi-scale approach for source code approximate match report", 2010 ACM, IWSC'10, May 8, 2010, Cape Town, South Africa, pp. 89-60; <http://dl.acm.org/citation.cfm?id=1808919>.*
Warren Toomey, "Code Similarity Comparison of Multiple Source Trees", Apr. 23, 2008, Bond University, pp. 1-12; <http://minnie.tuhs.org/Seminars/ComparingCode2008/ccode2008.pdf>.*
Cui et al., "Code Comparison System Based on Abstract Syntax Tree", 2011 IEEE, pp. 668-673; <http://ieeexplore.ieee.org/stamp/stamp.jsp?tp=&arnumber=5705174>.*

* cited by examiner

*Primary Examiner* — Thuy Dao
*Assistant Examiner* — Ben C Wang
(74) *Attorney, Agent, or Firm* — Lowenstein Sandler LLP

(57) ABSTRACT

A computer system identifies a plurality of source code files to be compared, parses each source code file to identify a code statement structure present in the file, and compares the plurality of source code files using corresponding code statement structures.

21 Claims, 5 Drawing Sheets

COMPARING SOURCE CODE USING CODE STATEMENT STRUCTURES

TECHNICAL FIELD

Embodiments of the present invention relate to comparing source code files. Specifically, embodiments of the invention relate to a method and system for comparing code statement structures within multiple source code files.

BACKGROUND

In many instances, it may be helpful for programmers and others to compare two source code files to analyze the differences between them. This may be done for purposes such as debugging, checking for copyright infringement, etc.

Current tools for comparing text files scan the files line by line and output the changes made on a per line basis. However, source code files differ from common text files because the source code statements within a particular source code file have an implicit structure. Therefore, the current tools are a less than effective means of comparing the differences between source code files. When comparing source code files, it is less relevant what changes have been made on a line by line basis but rather whether the underlying structure of the source code file has been changed (e.g., whether two source code files contain the same functions, variables, etc).

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for comparing source code files are described herein. In one embodiment, a source code comparison tool identifies multiple source code files that are to be compared and parses each of the files to determine a code statement structure present in each of the files. The source code comparison tool then compares each of the files using the determined code statement structure and reports the differences between the source code files to a user.

With embodiments of the invention, the comparison of source code files is no longer line by line but is rather focused on changes that affect the underlying structure of the source code files, providing more efficient and accurate results.

Figure 1:
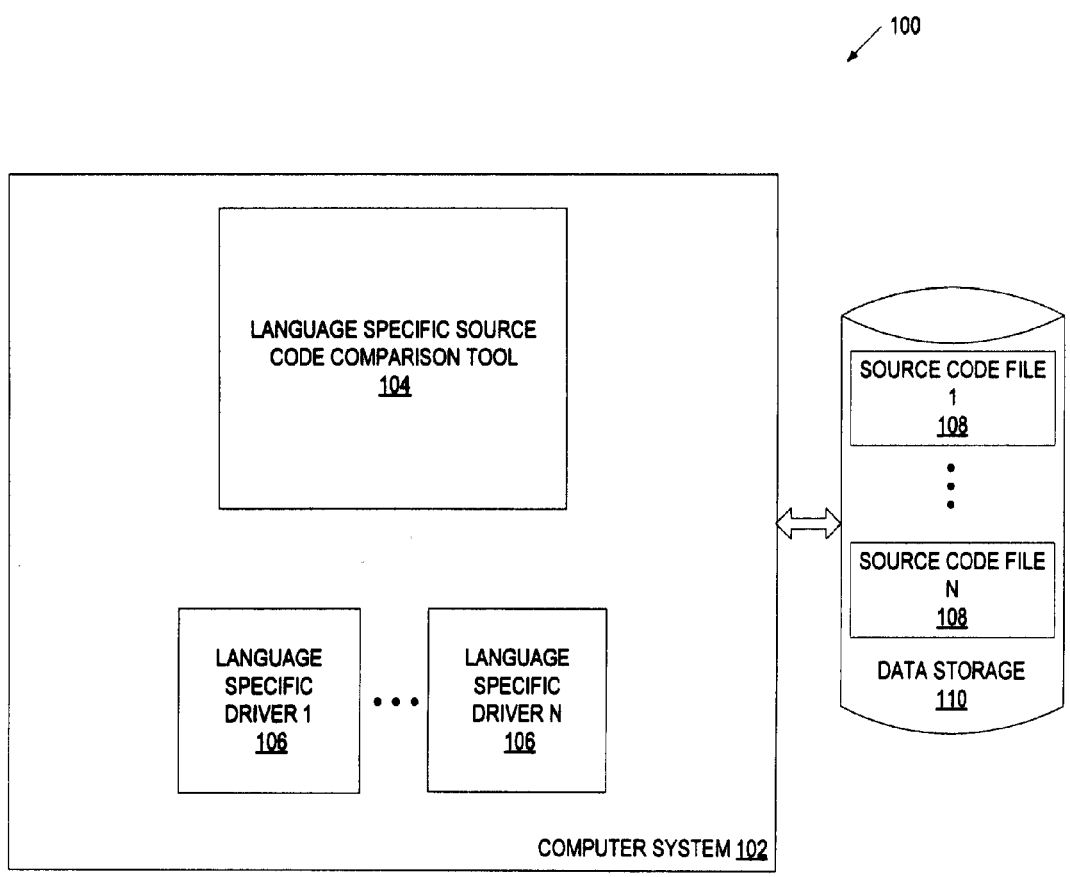
FIG. 1 illustrates an exemplary system architecture in which embodiments of the invention may operate.

FIG. 1 illustrates an exemplary system architecture 100 in which embodiments of the invention may operate. The architecture 100 includes a computer system 102 and data storage 110 including multiple source code files 108. Computer system 102 may be a desktop computer, a server computer, or any other computing device. An exemplary computer system is described in more detail below in conjunction with FIG. 5. Data storage 110 may include one or more storage devices such as electronic devices (e.g., main memory) or mass storage devices (e.g., magnetic or optical storage based disks, tapes, hard drives, etc.).

The computer system 102 may include a language specific source code comparison tool 104 and language specific drivers 106. The language specific source code comparison tool 104 identifies source code files 108 that should be compared. Source code files 108 may be sent by a user via a network (e.g., public or private network), identified by a user via a link or file name, etc.[[.]] Source code files 108 may be written in a particular programming language (e.g., C, the PYTHON™ programming language, etc.).

Language specific source code comparison tool 104 compares multiple source code files written in the same programming language and outputs differences in their source code statement structures. In one embodiment, source code comparison tool 104 uses language specific drivers 106 when comparing source code files. Each language specific driver 106 may correspond to a particular programming language. For example, one driver 106 may correspond to the C language, one driver 106 to the PYTHON™ language, etc. When source code files that are to be compared by the comparison tool 104 are written in the PYTHON™ language, source code comparison tool will invoke the driver 106 that corresponds to the PYTHON™ language in carrying out the comparison.

Alternatively, the functionality of language specific drivers 106 may be combined into a single component containing multiple drivers, with each driver corresponding to a particular programming language.

It should be noted that language specific source code comparison tool 104 may be used to compare any data streams having an underlying structure (e.g., structured protocols, markup languages such as Extensible Markup Language (XML), etc.) without loss of generality.

Figure 2:
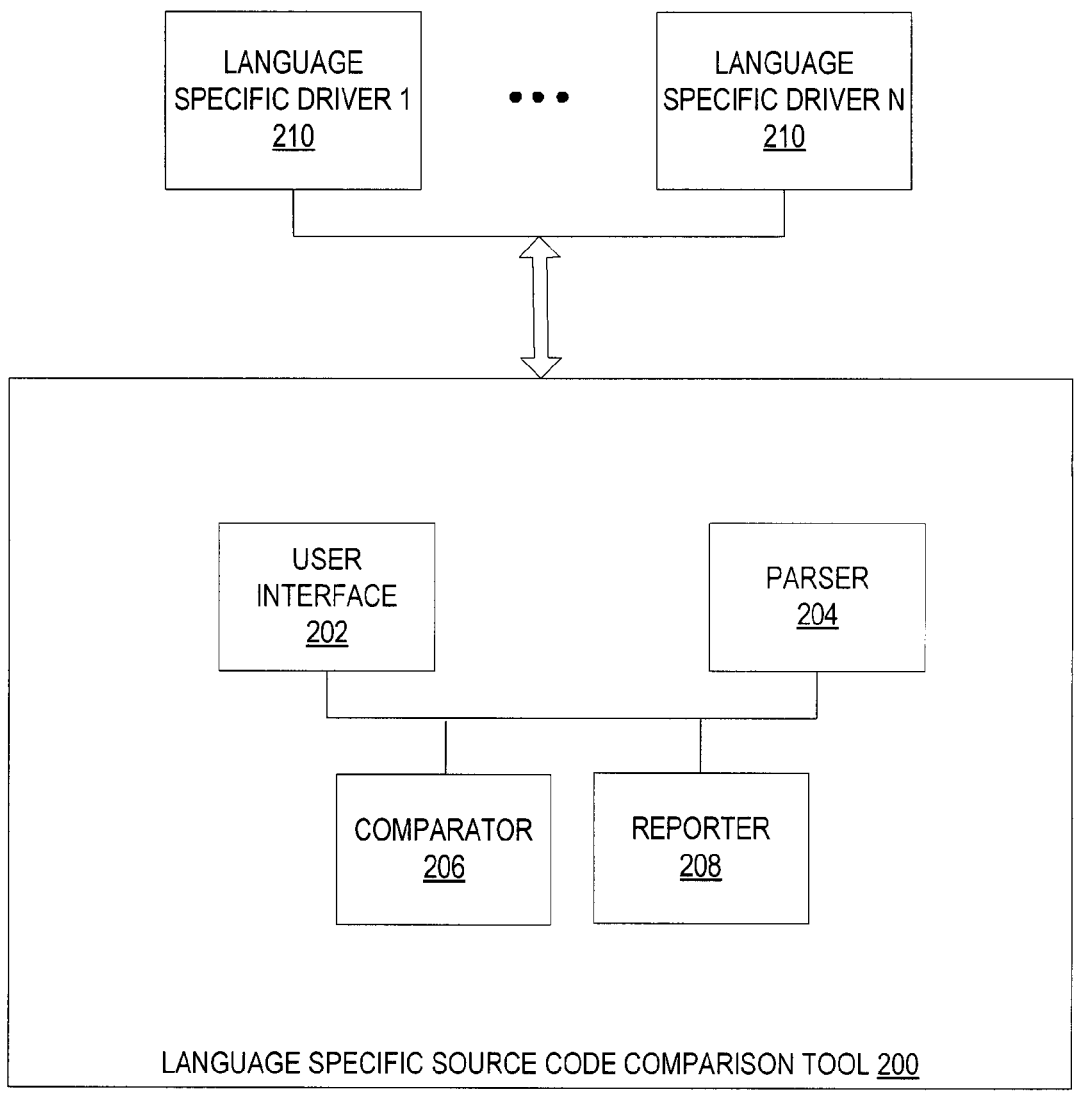
FIG. 2 is a block diagram of one embodiment of a source code comparison tool.

FIG. 2 is a block diagram of one embodiment of a language specific source code comparison tool 200. The language specific source code comparison tool 200 may be the same as language specific source code comparison tool 102 of FIG. 1. The comparison tool 200 includes a user interface 202, a parser 204, a comparator 206, and a reporter 208. The comparison tool 200 may also interface with multiple language specific drivers 210.

The user interface 202 receives user inputs identifying source code files that are to be compared by the source code comparison tool. In one embodiment, the source code files are stored on a user device and are provided by the user. The user device may host the comparison tool 200, or alternatively, the comparison tool may be hosted by a server computer communicating with the user device via a public or private network. In another embodiment, the source code files may be stored remotely from the user device and a user may provide only a link to the files. In one embodiment, the user interface 202 also receives information identifying the programming language that the source code files are written in.

Parser 204 parses each source code file to identify the structure of the code statements in each file. The parser 204 generates a mapping from the language specific structure of the source code files to an internal structure that is common for all languages. The internal structure may delineate all of the code statement structures present in each source code file. Examples of code statement structures that may be parsed include pre-processor arguments, function declarations, nested loops, other programming objects, etc.

In one embodiment, this is done using a language specific driver 210. Parser 204 may use the information identifying the programming language that each file is written in to select the driver out of the language specific drivers 210 that corresponds to the programming language. Each of the language specific drivers 210 may correspond to a particular programming language. In another embodiment, parser 204 identifies the language that the source code files are written in based on the make-up of the source code file and uses that identification to select a corresponding driver. If none of the language specific drivers 210 correspond to the identified programming language, parser 204 may instruct reporter 208 to output an error message. Alternatively, if no corresponding driver exists, parser 204 may instruct comparator 206 to do a generic line by line comparison of the two files without using one of the drivers 210.

Each of the language specific drivers 210 may be used by the parser 204 to parse source code files written in a particular programming language. Language specific drivers are needed to parse the source code files because many programming languages have a structure that is at least somewhat unique, and all programming languages use a unique syntax. For example, many programming languages support nesting, but each language may represent nesting differently. Therefore, a language specific driver may be needed to, for instance, recognize how the particular programming language accomplishes nesting before a source code file written in that language may be parsed.

In one embodiment, the parser 204 uses the appropriate language specific driver 210 to generate an internal representation of the code statement structures for each source code file. This internal representation may be a list of all of the objects (e.g., functions, variables, other objects, etc.) present in each source code file. The representation may be arranged so that parent objects are associated with their children. Exemplary representations of some source code files are discussed in conjunction with FIG. 4.

In some circumstances, parser 204 may not be able to parse certain portions of the source code files. This may occur because those portions have text that is not a valid expression in a programming language. Alternatively, the portions may be valid, but may lack a structure because they contain comments, etc. In these cases, the parser 204 may recognize that the portions of the file are valid, but be unable to parse them because they do not have any code statement structures. When portions of code are unable to be parsed, parser 204 may instruct comparator 206 to compare those portions line by line to determine whether any differences exist on each line of the unparsed code.

Comparator 206 compares the source code files that have been parsed by parser 204 to determine the differences between the source code files. Reporter 208 may then report the outcome of the comparison to a user. In comparing the files, the comparator 206 may use the internal representation generated by parser 204. In some embodiments, comparator 204 and reporter 208 use only the common internal representation and can therefore function independently of the programming language that the source code files are written in. In one embodiment, comparator 206 may check to see if the code statement structure is the same in each internal representation (e.g., all of the same objects are present in the internal representation of each source code file). If, for example, all of the structures in two source code files are identical (e.g., both files have the same objects, the objects have the same children, the children have the same data types, etc.), the comparator determines that no difference between the two files exists and instructs reporter 208 to notify the user accordingly. However, if an object in one source code file is identical to another object in a second source code file but is named differently in the second file, the comparator will determine that the structure of the two objects is the same and instruct reporter 208 to notify the user that the object has one name in a first source code file and a second name in a second source code file. Alternatively, one file may have an object that is not present in another file. If, for example, a first source code file has a function that is not present in a second source code file, comparator 206 may determine that a function that is present in the internal representation of the first source code file is not present in the representation of the second and instruct reporter 208 to notify the user that a new function has been added.

In reporting the outcome to the user, reporter 208 may provide a summary of the differences between each source code file. The summary may consist of all of the differences determined to exist between the source code files by the comparator 206. If, for example, an object named "name" in a first source code file is named "new_name" in a second source code file, reporter 208 may provide the following output, as part of the summary:

At <parent_object>: <object><name> is now called <new_name>.

This output indicates that at the parent of the object with the name change, the object has had its name changed from "name" to "new name." If a function is present in one file that isn't present in another, the function having the name "f_name" reporter 208 may provide the following output, as part of the summary:

At <toplevel>: New function "f_name" added

This output indicates that, at the top level of the structure of the source code files, a new function has been added with the name "f_name." Any other differences between the source code files that are identified by the comparator 206 may be output as part of the summary in a similar fashion.

Reporter 208 may also present the user with the code statements that are different between the two files. If, for example, two files are being compared and one has a function that is not present in the other, reporter 208 may display the function as well as indicating that it is only present in one of the files. In one embodiment, reporter 208 outputs code statements automatically along with the summary of the differences. Alternatively, the reporter 208 may output the code statements only if a user requests to see them after viewing the summary.

Figure 3:
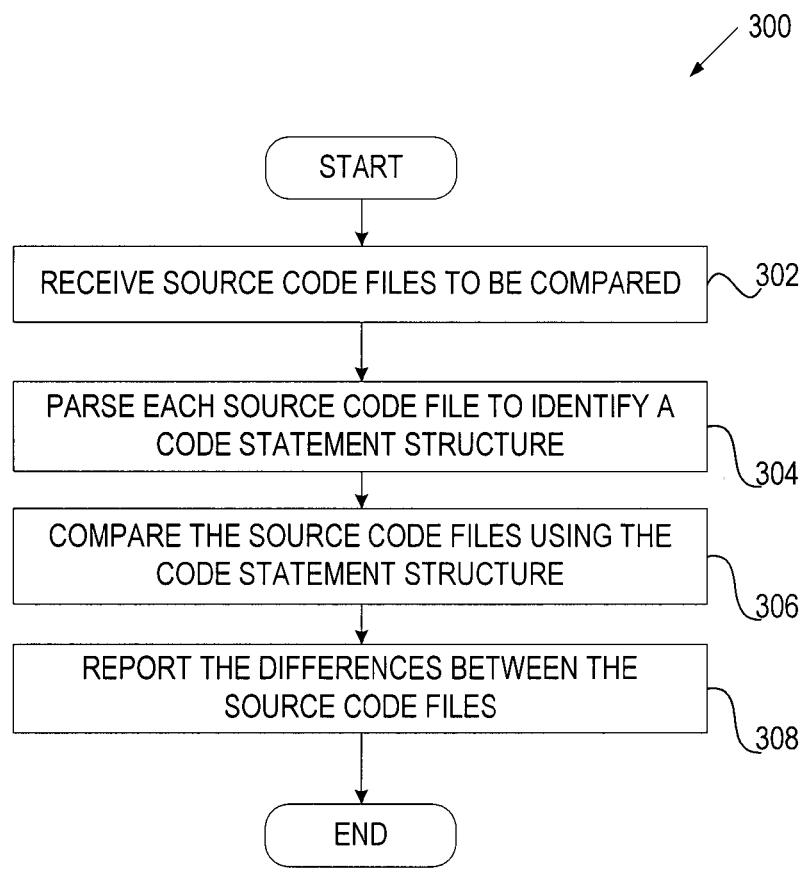
FIG. 3 is a flow diagram of one embodiment of a method for comparing source code files using code statement structures.

FIG. 3 is a flow diagram of one embodiment of a method 300 for comparing source code files using code statement structures. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a language specific source code comparison tool (e.g., language specific source code comparison tool 104 of FIG. 1).

Referring to FIG. 3, processing logic identifies multiple source code files to be compared at block 302. In one embodiment, the files are stored on a user device and provided by the user for comparison. In another embodiment, a user may designate files stored remotely to be compared, and processing logic may access those files to initiate the comparison. Processing logic may also receive information from the user identifying the programming language that the files to be compared are written in. Alternatively, processing logic may identify the programming language upon examining the files.

In one embodiment, this may be done based on the code statement structure of the source code files.

At block 304, processing logic parses each source code file to identify a code statement structure of each source code file. In one embodiment, processing logic uses a language specific driver to parse the source code files into an internal representation that is common for all programming languages. Processing logic may use the driver that corresponds to the programming language that the received source code files are written in to parse all received source code files that are written in that language. The internal representation may list all of the code statement structures (e.g., functions, variables, other objects, etc.) that appear in each source code file.

At block 306, processing logic compares the source code files using the code statement structure. In one embodiment, the comparison is made between the internal representations generated by the parsing of each source code file. Based on the internal representation, processing logic may identify which structures are identical in all of the source code files, which structures are present in only some of the source code files, which structures have been modified or renamed from one source code structure to another, etc.

At block 308, processing logic reports the differences between the source code files. In one embodiment, the output may consist of a summary of the differences between the source code files. Alternatively, the output may also contain the actual source code statements that are different between the source code files.

Figure 4:
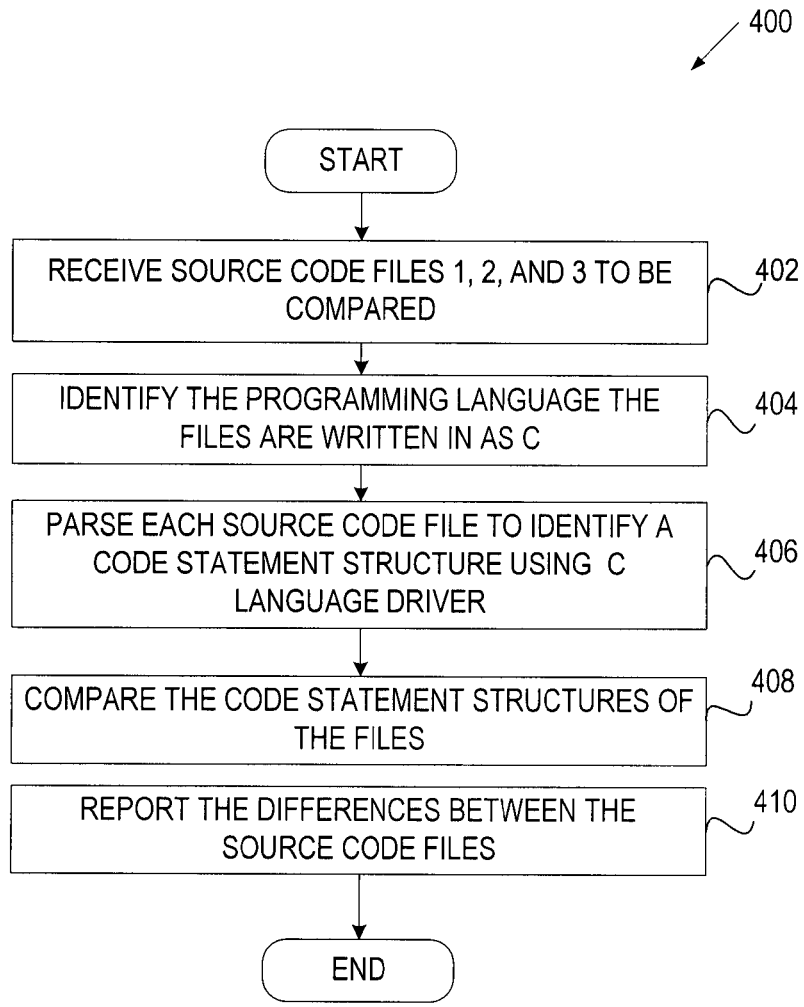
FIG. 4 is a flow diagram of one embodiment of a method for comparing exemplary source code files using code statement structures.

FIG. 4 is a flow diagram of one embodiment of a method 400 for comparing three exemplary source code files. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a language specific source code comparison tool (e.g., language specific source code comparison tool 104 of FIG. 1).

Referring to FIG. 4, method 400 begins with processing logic receiving source code files 1, 2, and 3 to be compared at block 402. In one embodiment, these files are provided by a user. Source code file 1 may consist, in part, of the following code:

```
source1.c:
#include <stdio.h>
void example1(int n)
{
    while(n--)
    {
        printf("n now is : %d\n", n);
    }
}
```

Source code file 2 may consist, in part, of the following code:

```
source2.c:
#include <stdio.h>
void example1(long n)
{
    while (n--){
        printf("n now is : %d\n", n);
    }
}
```

Source code file 3 may consist, in part, of the following code:

```
source3.c:
#include <stdio.h>
void example1(long n) {
    while(n--)
    {
        printf("n now is : %d\n", n);
    }
}
```

After identifying the source code files, processing logic identifies the programming language that the files are written as C at block 404. In one embodiment, this information is provided by the user. In another embodiment, processing logic identifies the language automatically based on the structure of the source code files.

At block 406, processing logic parses each of the files 1, 2, and 3 using a driver particular to the C programming language to identify a code statement structure for each of the files. The code statement structure may be identified in a internal representation that has a format that is common for all programming languages. In one embodiment, source code excerpts 1 and 3 may be internally represented by the following:

```
top_level:
    preproc(include, <stdio.h>)
    f_decl(void, example1, int, n)
        loop(while,
            var(n, decrement)
        )
        f_call(printf, "n now is : %d\n", n)
```

Despite the fact that source code excerpts 1 and 3 have a different line spacing, the parser recognizes that they have the same code statement structure and creates the same internal representation for both of them. This representation indicates that the excerpts contain a pre-processor argument, a object representing a function (a function declaration) called 'example1' having an int argument 'n.' The representation also indicates that the function contains a while loop with a variable decrement inside.

Source code excerpt 2 may be represented by:

```
top_level:
    preproc(include, <stdio.h>)
    f_decl(void, example1, long, n)
        loop(while,
            var(n, decrement)
        )
        f_call(printf, "n now is : %d\n", n)
```

This representation indicates that source code excerpt 2 contains a pre-processor argument, a function declaration called 'example1,' but unlike source codes 1 and 3, 'example1' has an argument 'n' of type long.

At block 408, processing logic compares the code statement structures by comparing the internal representations of each source code file When the internal representations of source code excerpts 1 and 3 are compared, processing logic determines that they are the same despite the fact that the original source code files looked different. When source code excerpt 1 and 2 are compared, processing logic may identify that both 1 and 2 have an object that represents a function, the parent of that object is called 'toplevel' and the object is called 'example1.' However, in 2, the argument 'n' of the function 'example1' is of the type long, and in 1 the argument is of the type int.

At block 408, processing logic reports the differences between the source code files. For the differences between 1 and 2, processing logic may output:

At <toplevel>:

function "example1": argument 'n' has type long (was int) showing that the type of the argument of 'example1' changed between source code 1 and source 2. Alternatively, the output may also display the object that is different (in this case, function 'example1') so that the user can see the differences.

Figure 5:
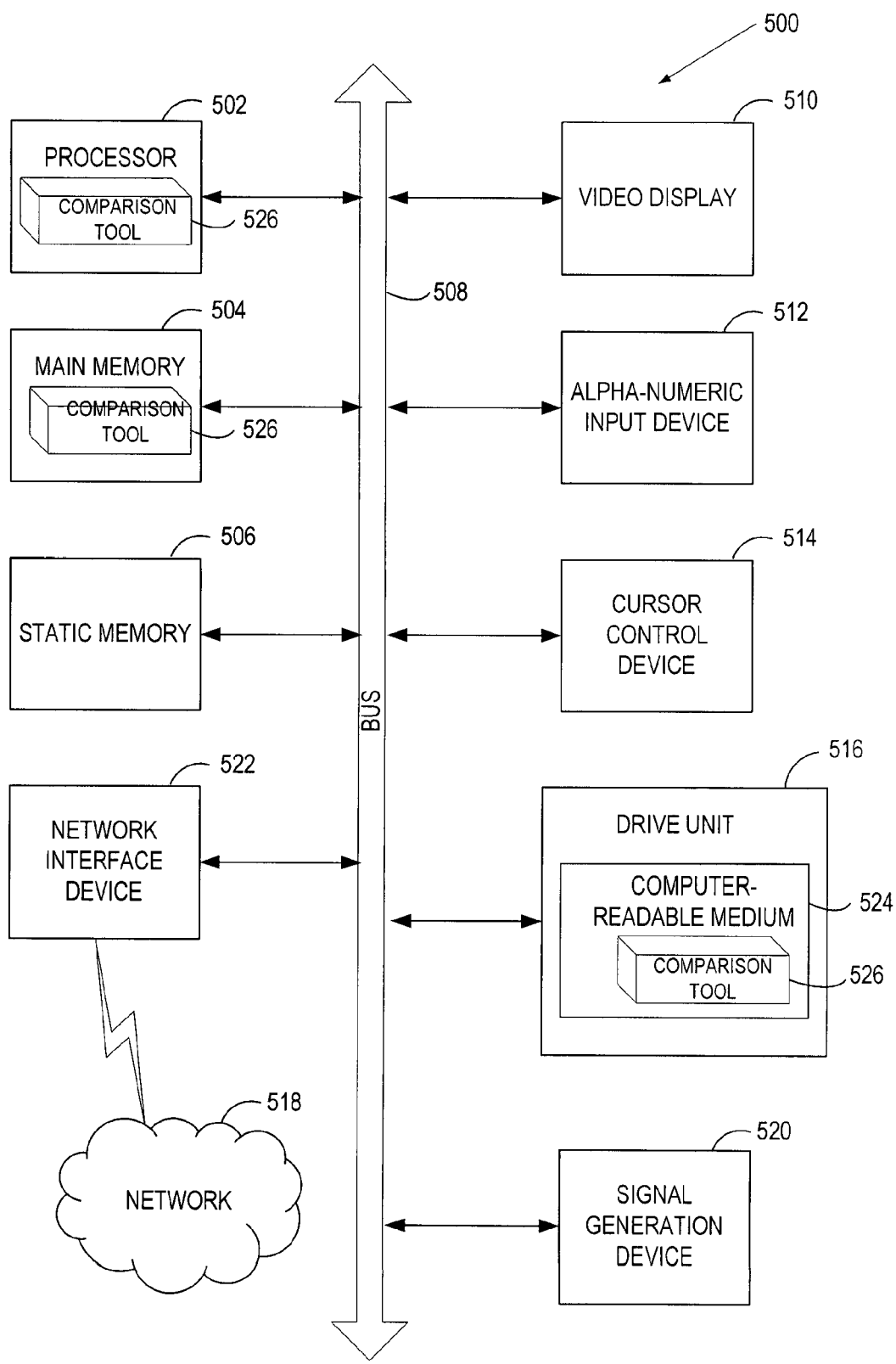
FIG. 5 is a block diagram of one embodiment of a computer system.

FIG. 5 is a block diagram of one embodiment of a computer system 500 for comparing source code files. Within the computer system 500 is a set of instructions for causing the computer system 500 to perform any one or more of the methodologies for comparing source code files discussed herein. In alternative embodiments, the computer system 500 may be connected (e.g., networked) to other machines in a LAN, an intranet, an extranet, or the Internet. The computer system 500 can operate in the capacity of a server machine or a client machine in a client-server network environment, or as a peer machine in a peer-to-peer (or distributed) network environment. The computer system 500 may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies for comparing source code files discussed herein.

The exemplary computer system 500 includes one or more processing devices 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing devices 502 represent one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions of language specific source code comparison tool 104 for performing the operations and steps for comparing source code files discussed herein.

The computer system 500 may further include a network device 522 (e.g., NIC, Ethernet network card, etc.). The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions of language specific source code comparison tool 104 embodying any one or more of the methodologies or functions for comparing source code files described herein. The instructions of the language specific source code comparison tool 104 may also reside, completely or at least partially, within the main memory 504 and/or within the processing device 502 during execution thereof by the computer system 500, the main memory 504 and the processing device 502 also constituting machine-readable storage media. The instructions of the language specific source code comparison tool 104 may further be transmitted or received over a network 518 via the network device 522.

The computer-readable storage medium 524 may also be used to store the instructions of the language specific source code comparison tool 104 persistently. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies for comparing source code files described herein. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "parsing," "comparing," "receiving" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for comparing source code files. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for comparing source code files using code statement structures has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   identifying a plurality of source code files to be compared;
   parsing, using a processor, each of the identified source code files to generate a common code statement structure for each respective source code file, wherein each common code statement structure is generated based on a mapping between a specific structure of a programming language used in a respective source code file and a common structure that is programming language independent;
   comparing, using the processor, the generated code statement structures to determine a difference between the source code files; and
   providing, using the processor, a result of the comparing, wherein the result comprises the difference between the source code files.

2. The method of claim 1, further comprising:
   receiving an input identifying a programming language used in the source code files.

3. The method of claim 1, further comprising:
   identifying a programming language used in the source code files, wherein the programming language is identified based on analyzing the source code files.

4. The method of claim 1, wherein the parsing is performed by a driver associated with a programming language used in the source code files.

5. The method of claim 4, wherein the parsing comprises:
   converting the code statement structures to a common internal representation using the driver associated with the programming language.

6. The method of claim 1, wherein the result comprises a summary of the differences between the source code files as determined by the comparing.

7. The method of claim 6, wherein the result further comprises source code text corresponding to a difference between the code statement structures.

8. A non-transitory computer readable storage medium having instructions stored thereon that, when executed by a processor, cause the processor device to perform operations comprising:
   identifying a plurality of source code files to be compared;
   parsing, using the processor, each of the identified source code files to generate a common code statement structure for each respective source code file, wherein each common statement structure is generated based on a mapping between a specific structure of a programming language used in a respective source code file and a common structure that is programming language independent;
   comparing, using the processor, the generated code statement structures to determine a difference between the source code files; and
   providing, using the processor, a result of the comparing, wherein the result comprises the difference between the source code files.

9. The non-transitory computer readable storage medium of claim 8, the operations further comprising:
   receiving an input identifying a programming language used in the source code files.

10. The non-transitory computer readable storage medium of claim 8, the operations further comprising:
    identifying a programming language used in the source code files, wherein the programming language is identified based on analyzing the source code files.

11. The non-transitory computer readable storage medium of claim 8, wherein the parsing is performed by a driver associated with a programming language used in the source code files.

12. The non-transitory computer readable storage medium of claim 11, wherein the parsing comprises:
    converting the code statement structures to a common internal representation using the driver associated with the programming language.

13. The non-transitory computer readable storage medium of claim 11, wherein the result comprises a summary of the differences between the source code files as determined by the comparing.

14. The non-transitory computer readable storage medium of claim 13, wherein the result further comprises source code text corresponding to a difference between the code statement structures.

15. A system comprising:
   a memory; and
   a processor coupled with memory to:
      identify a plurality of source code files to be compared;
      parse each of the identified source code files to generate a common code statement structure for each respective source code file, wherein each common statement structure is generated based on a mapping between a specific structure of a programming language used in a respective source code file and a common structure that is programming language independent;
      compare the generated code statement structures to determine a difference between the source code files; and
      provide a result of the comparing, wherein the result comprises the difference between the source code files.

16. The system of claim 15, wherein the processor further:
   receives an input identifying a programming language used in the source code files.

17. The system of claim 15, wherein the processor further:
   identifies a programming language used in the source code files, wherein the programming language is identified based on analyzing the source code files.

18. The system of claim 15, wherein the parsing is performed by a driver associated with a programming language used in the source code files.

19. The system of claim 15, wherein the parsing comprises:
   converting the code statement structures to a common internal representation using the driver associated with the programming language.

20. The system of claim 15, wherein the result comprises a summary of the differences between the source code files as determined by the comparing.

21. The system of claim 20, wherein the result further comprises source code text corresponding to a difference between the code statement structures.

\* \* \* \* \*